United States Patent [19]

Hasshi et al.

[11] Patent Number: 5,662,349

[45] Date of Patent: Sep. 2, 1997

[54] SUSPENSION ARM, AND PROCESS FOR PRODUCING THE SAME

[75] Inventors: Suehiro Hasshi; Toshifumi Yamamoto; Tadayoshi Nakamura, all of Wako; Noboru Ashikawa, Sayama; Tetsuro Saruwatari, Saitama; Masanobu Nakamura, Kamakura, all of Japan

[73] Assignees: Honda Giken Kogyo Kabushiki Kaisha; Yanagawa Seiki K.K., both of Tokyo; K. K. Tube Forming, Yokohama, all of Japan

[21] Appl. No.: 504,333

[22] Filed: Jul. 19, 1995

[30] Foreign Application Priority Data

Jul. 20, 1994 [JP] Japan ................... 6-167883

[51] Int. Cl.⁶ ........................................... B60G 3/00
[52] U.S. Cl. .................. 280/690; 280/675; 29/897.2
[58] Field of Search ............................ 280/690, 691, 280/673, 675, 663, 688, 93, 96.1; 52/731.6; 29/897.2

[56] References Cited

U.S. PATENT DOCUMENTS

| | | | |
|---|---|---|---|
| 4,650,620 | 3/1987 | Owen et al. | 280/690 |
| 4,822,073 | 4/1989 | Tanahashi et al. | 280/691 |
| 5,310,211 | 5/1994 | DelBeke | 280/690 |
| 5,338,057 | 8/1994 | Dickerson et al. | 280/691 |
| 5,362,090 | 11/1994 | Takeuchi | 280/673 |

FOREIGN PATENT DOCUMENTS 1267549  6/1961  France ................... 280/663

Primary Examiner—Paul N. Dickson
Attorney, Agent, or Firm—Nikaido, Marmelstein, Murray & Oram LLP

[57] ABSTRACT

A suspension arm for a vehicle is provided, the suspension arm including an L-shaped arm body having a first end portion, an intermediate portion, and a second end portion. The first end portion is adapted to pivotally connect the arm body to a vehicle. The intermediate portion has a bulge formed thereon which is adapted to pivotally connect the arm body to the vehicle. The second end portion is adapted to connect the arm body to a vehicle wheel knuckle. The arm body is formed from a single piece of pipe material having a closed cross-section.

6 Claims, 16 Drawing Sheets

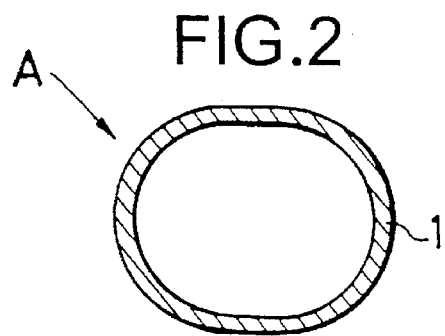
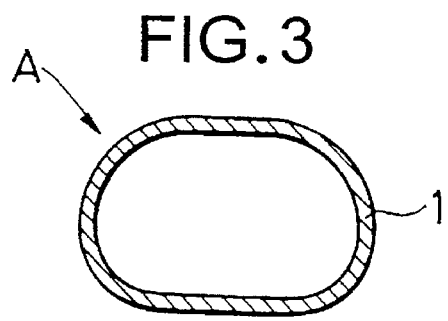
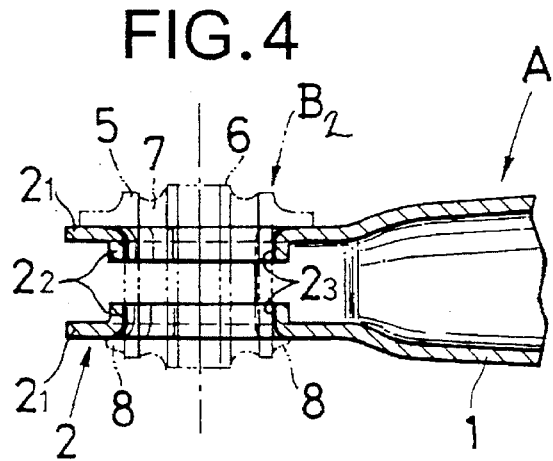

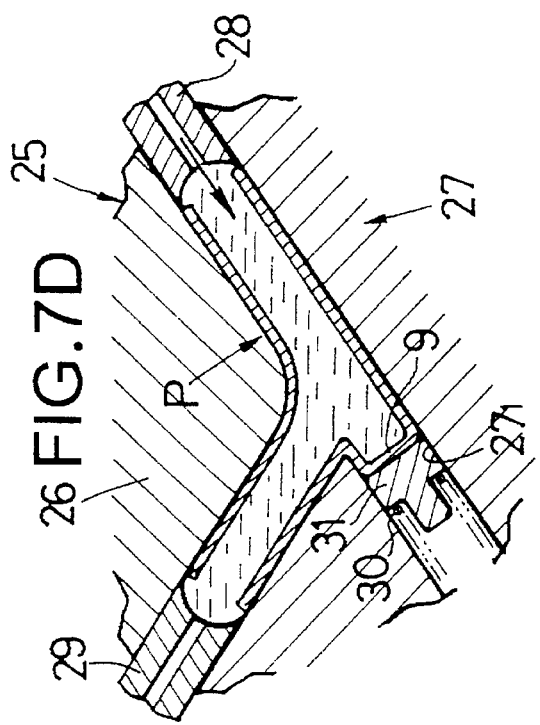
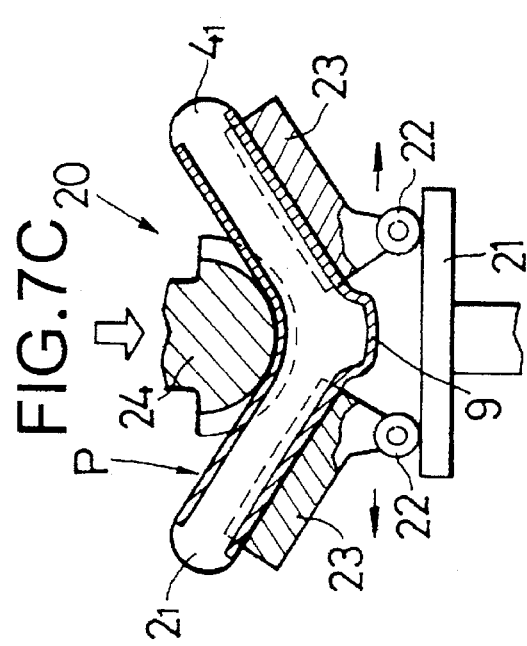
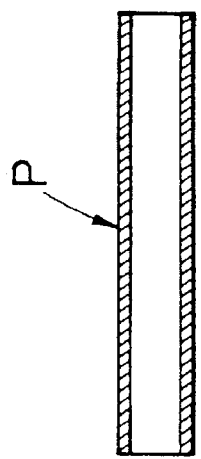
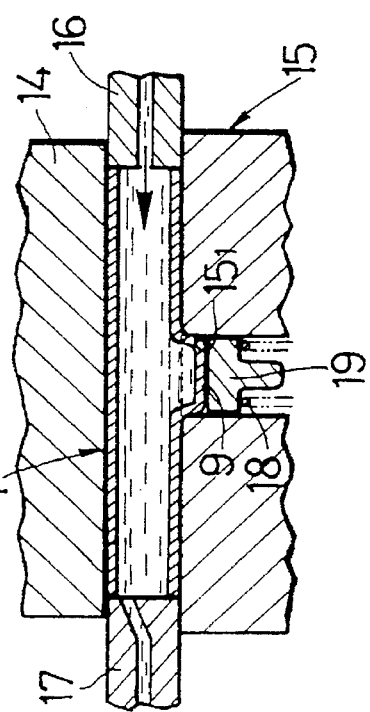

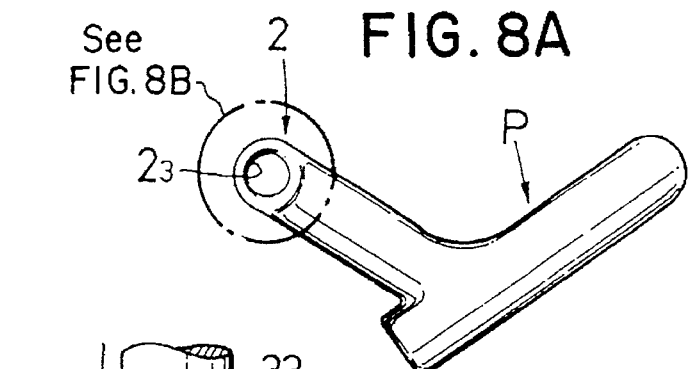
FIG. 8A
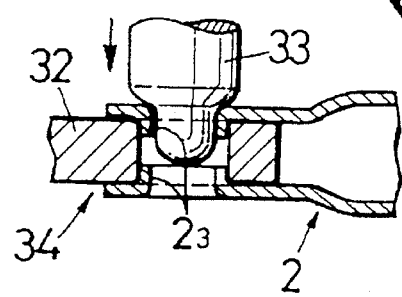
FIG. 8B
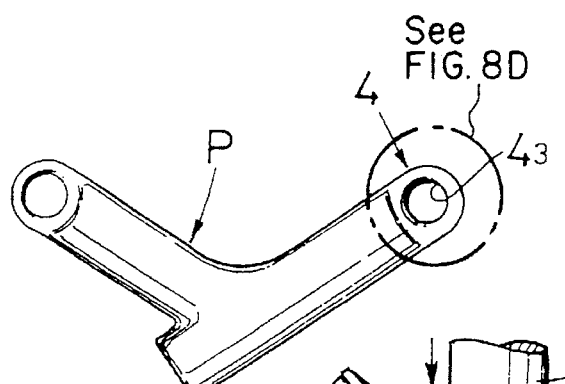
FIG. 8C
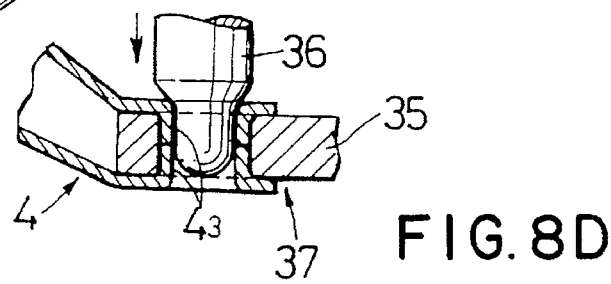
FIG. 8D
FIG. 8E
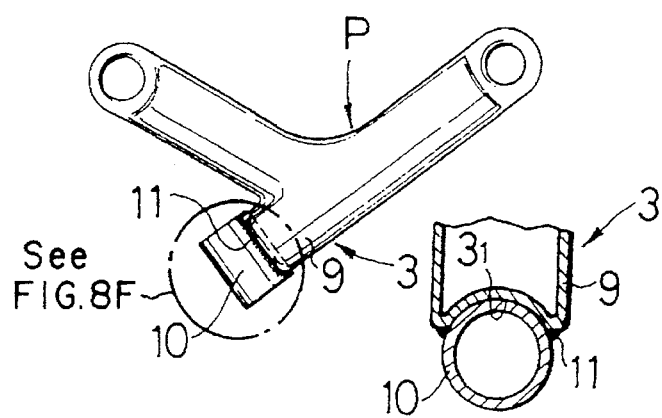
FIG. 8F

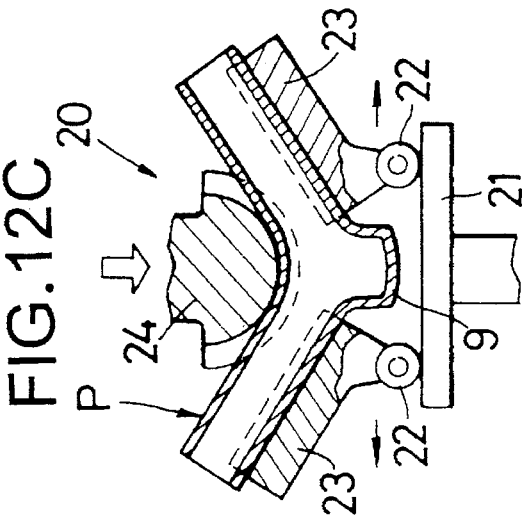
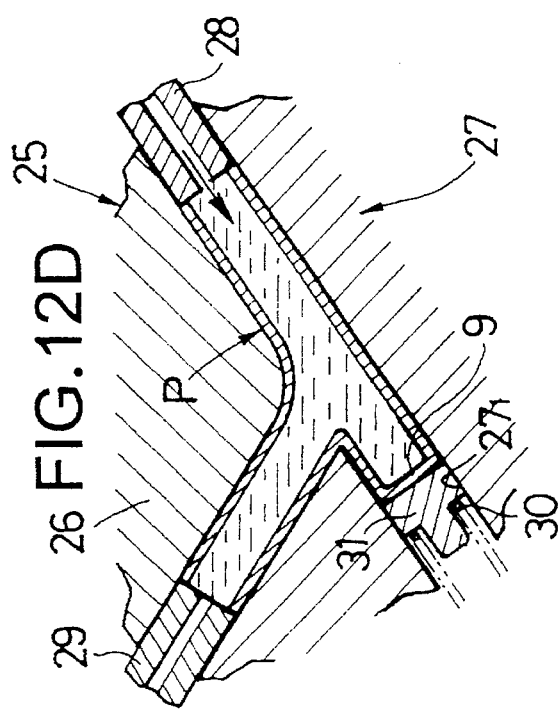
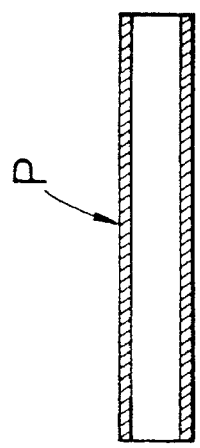
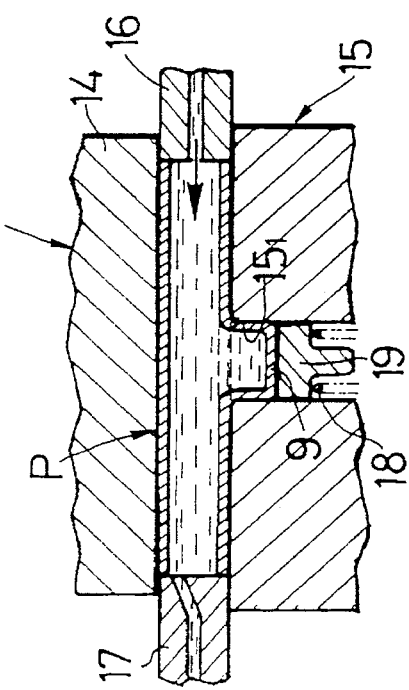

FIG. 13A
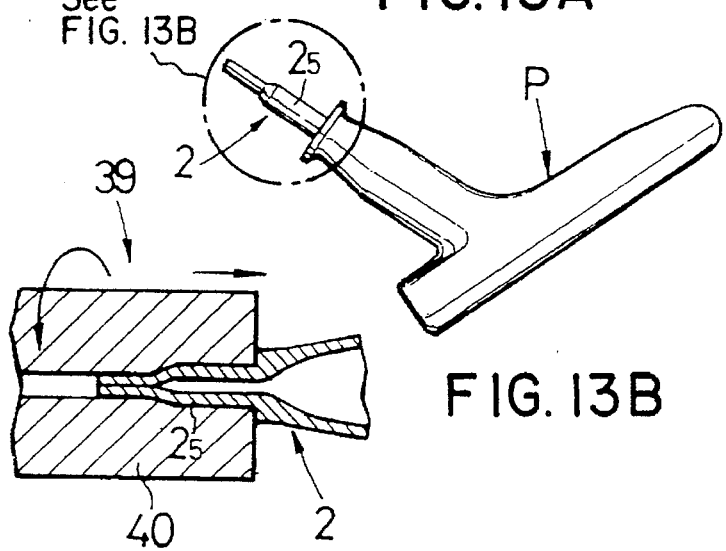
FIG. 13B
FIG. 13C
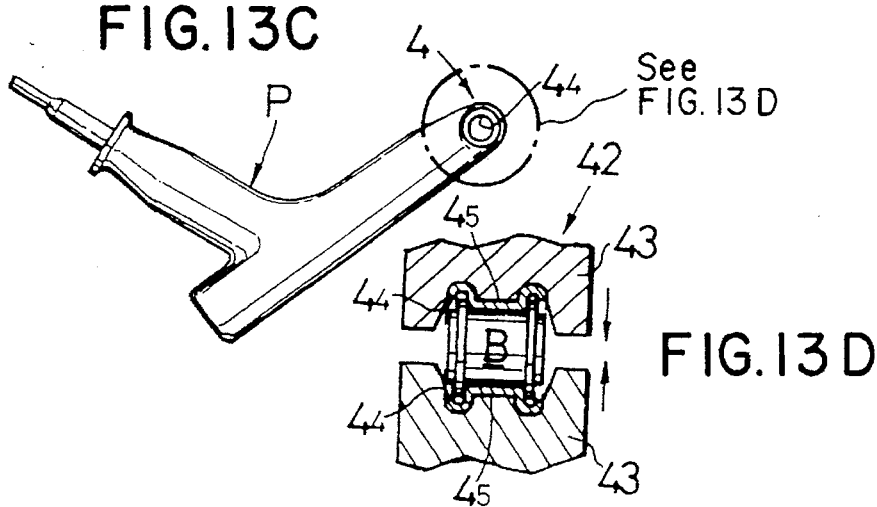
FIG. 13D
FIG. 13E
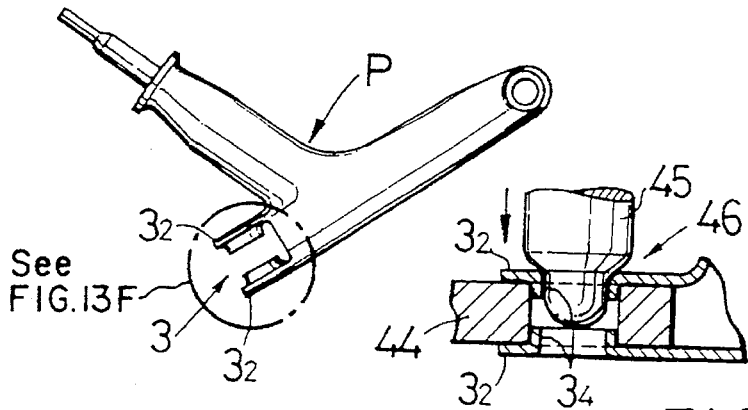
FIG. 13F

2(4)

2(4)

2(4)

2₃(4₃)

10,662,349

SUSPENSION ARM, AND PROCESS FOR PRODUCING THE SAME

BACKGROUND OF THE INVENTION

1. Field of the Invention

The present invention relates to a suspension arm for a vehicle having a first vehicle body pivoting portion and a second vehicle body pivoting portion which are respectively provided at one end and an intermediate portion of a substantially L-shaped arm body, and which are adapted to be connected to a vehicle body. A knuckle pivoting portion is provided at the other end of the arm body for connection to a knuckle. The present invention is also directed to a process for producing the same.

2. Description of the Prior Art

In the prior art, a vehicle suspension arm having a knuckle for vertically, swingably pivoting, to a vehicle body, and which rotatably supports a wheel, has been formed primarily from a forged piece of an iron-based material or a pressed piece of a steel plate.

The suspension arm made of the forged piece has a problem that it is not only heavy, but also the number of steps for producing the suspension arm is large, resulting in an increased manufacturing cost. On the other hand, the suspension arm made of the pressed piece has a problem that the material yield is poor, and also the suspension arm is low in rigidity and is poor in durability. If a reinforcing member of another piece is coupled by welding or bolting to the suspension arm made of the pressed piece in order to increase the rigidity of the suspension arm, the disadvantage of increased weight and number of steps arises.

SUMMARY OF THE INVENTION

The present invention has been accomplished with the above circumstances in view, and it is the primary object of the present invention to provide a suspension arm which is produced using a decreased number of parts or components and a decreased number of process steps and moreover, the suspension arm is lightweight and highly rigid. It is another primary object of the present invention to provide a process for producing the suspension arm.

To achieve the above objects, according to the present invention, there is provided a suspension arm, comprising a first vehicle body pivoting portion and a second vehicle body pivoting portion which are respectively provided at one end and an intermediate portion of a substantially L-shaped arm body, and which are adapted to be connected to a vehicle body. A knuckle pivoting portion is provided at the other end of the arm body for connection to a knuckle. The arm body is formed from a single piece of pipe material having a closed section.

According to the present invention, there is also provided a process for producing a suspension arm as set forth above, comprising the steps of: subjecting a piece of pipe material to a first bulging step to form a bulge at a circumferential portion of an intermediate portion of the pipe material, bending the pipe material into a substantially L-shape while keeping the bulge outside, subjecting the pipe material to a second bulging step to further swell the bulge, and forming the second vehicle body pivoting portion on the bulge.

In addition to the feature as set forth above, the cross-sectional area or the cross-sectional shape of the pipe material is changed, when the pipe material is subjected to the second bulging step.

Further, according to the present invention, the second vehicle body pivoting portion is formed by welding a collar or a bracket to the bulge.

Still further, according to the present invention, the second vehicle body pivoting portion has a support hole made by drilling through the bulge.

In another feature of the present invention, the first vehicle body pivoting portion or the knuckle pivoting portion is formed with a support hole made by drilling through an end of the pipe material.

Still further, according to the present invention, the first vehicle body pivoting portion or the knuckle pivoting portion is formed with a support shaft formed by subjecting ah end of the pipe material to a plastic working or shaping.

Still further, the first vehicle body pivoting portion or the knuckle pivoting portion is formed with a support portion formed by pressing an end of the pipe material.

BRIEF DESCRIPTION OF THE DRAWINGS

FIG. 2 is a sectional view taken along a line 2—2 in FIG. 1;

FIG. 3 is a sectional view taken along a line 3—3 in FIG. 1;

FIG. 4 is a sectional view taken along a line 4—4 in FIG. 1;

FIGS. 7A–7D are views for explaining a first portion of a process for producing the suspension arm of the present invention;

FIGS. 8A–8F are views for explaining a second portion of the producing process;

FIGS. 12A–12D are views for explaining a first portion of a process for producing the suspension arm of the present invention;

FIGS. 13A–13F are views for explaining a second portion of the producing process;

DETAILED DESCRIPTION OF THE PREFERRED EMBODIMENTS

Figure 1:
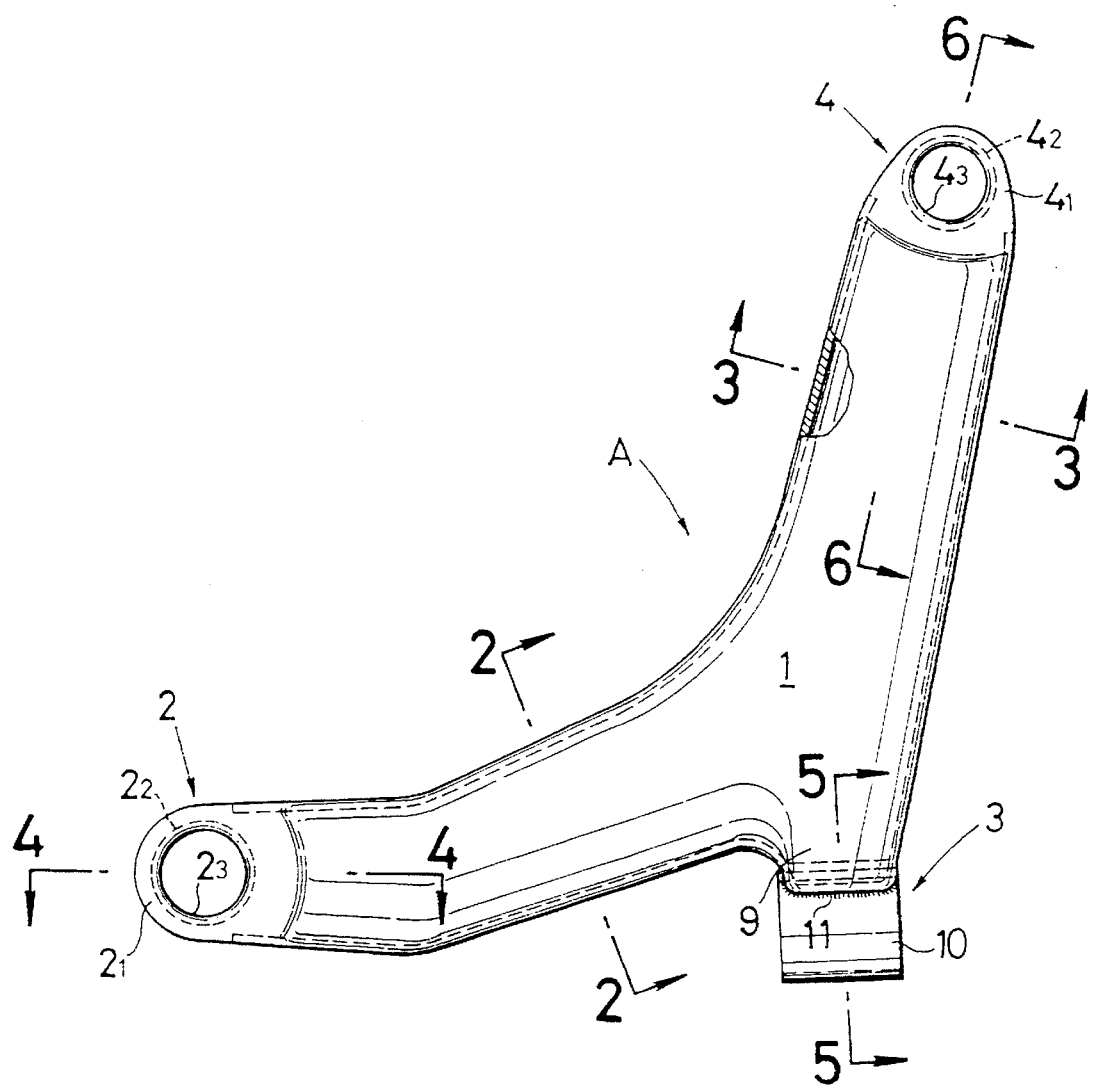
FIG. 1 is a plan view of the entire suspension arm according to a first embodiment of the present invention.

FIGS. 1 to 8 illustrate a first embodiment of the present invention. As shown in FIG. 1, the suspension arm A is a lower suspension arm for suspending a front wheel of a vehicle, and has an arm body I which is made by curving a piece of pipe material having a closed cross-section, into a substantially L-shape as viewed in a plane. A first vehicle body pivoting portion 2 is formed at one end of the arm body 1 and is adapted to be pivotally supported on a vehicle body frame with a rubber bush interposed therebetween. A second vehicle body pivoting portion 3 is formed at an intermediate portion of the arm body 1 and is adapted to be pivotally supported on the vehicle body frame with a rubber bush interposed therebetween. A knuckle pivoting portion 4 is formed at the other end of the arm body 1 and is adapted for pivoting a wheel-pinning knuckle through a rubber bush.

The arm body 1 is open only at the first vehicle body pivoting portion 2 and the knuckle pivoting portion 4 formed at opposite end thereof. As can be seen from FIGS. 2 and 3, the remaining portion of the arm body 1 has a substantially elliptical, closed cross-section.

As can be seen from FIGS. 1 and 4, the first vehicle body pivoting portion 2 includes a pair of plate-like portions $2_1$, $2_1$ vertically opposed to each other. The plate-like portions $2_1$, $2_1$ have inwardly projecting flanges $2_2$, $2_2$ respectively formed thereon by burring. A rubber bush $B_2$ is fitted into support holes $2_3$, $2_3$ in the inner peripheries of the flanges $2_2$, $2_2$. The bush $B_2$ comprises an outer collar 5, an inner collar 6 and an annular rubber 7. The rubber bush $B_2$ is fixed by subjecting the outer collar 5 to a caulking 8.

Figure 5:
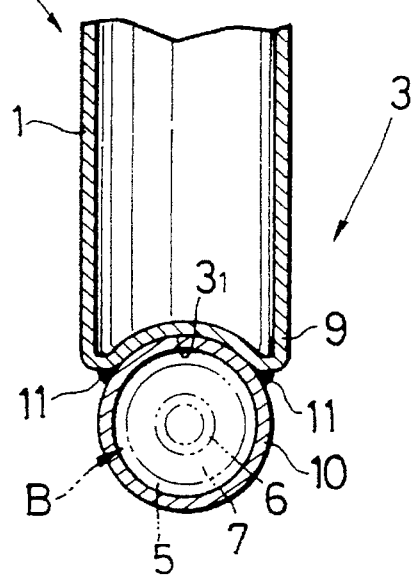
FIG. 5 is a sectional view taken along a line 5—5 in FIG. 1.

As can be seen from FIGS. 1 and 5, the second vehicle body pivoting portion 3 includes a bulge 9 which swells outwardly from a central bent portion of the arm body 1, and a collar 10 welded at 11 to an arcuate recess $3_1$ defined at a tip end of the bulge 9. The outer collar 5 of the rubber bush $B_3$ is fixed to an inner periphery of the collar 10 by press-fitting.

Figure 6:
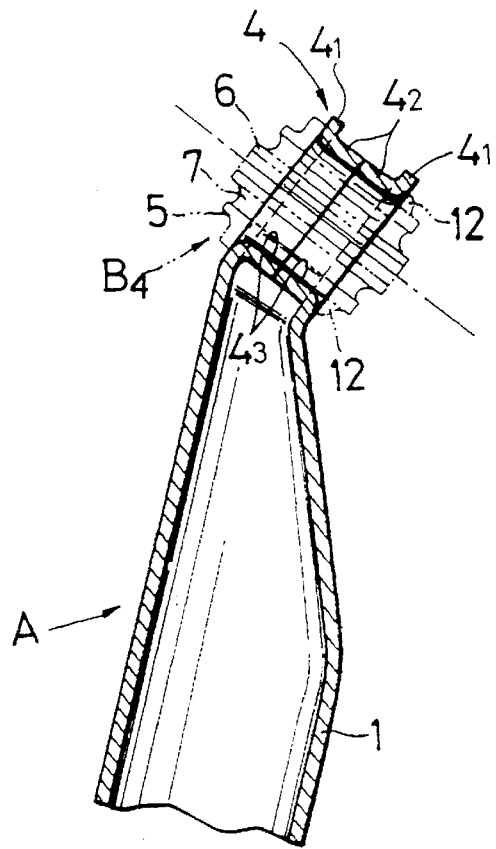
FIG. 6 is a sectional view taken along a line 6—6 in FIG. 1.

As can be seen from FIGS. 1 and 6, the knuckle pivoting portion 4 includes a pair of plate-like portions $4_1$, $4_1$ vertically opposed to each other. The plate-like portions $4_1$, $4_1$ have flanges $4_2$, $4_2$ which are formed thereon by burring and which project inwardly to abut against each other. A rubber bush $B_4$ is fitted into support holes $4_3$, $4_3$ in the inner peripheries of the flanges $4_2$, $4_2$, and is fixed by caulking its outer collar 5 with a caulking 12.

The suspension arm A having the above-described construction is produced by a process shown in FIGS. 7 and 8.

First, a piece of hollow metal pipe material P shown in FIG. 7A is bulged by a bulging machine 13 shown in FIG. 7B. The bulging machine 13 includes split dies 14 and 15 for supporting the pipe material P therein, sealing members 16 and 17 which are slidable in an axial direction to abut against opposite end faces of the pipe material P, respectively, and a piston 19 which is slidably received in a cylinder $15_1$ formed in one of the split dies 15 and which is biased by a spring 18. If high pressure is applied to oil filled in the pipe material P while moving the sealing members 16 and 17 inwardly, the intermediate portion of the pipe material P is swelled into the cylinder $15_1$ while urging the piston 19, thereby forming the bulge 9.

Then, the pipe material P with the bulge 9 turned outwardly, is bent into a substantially L-shape by a press bending machine 20 shown in FIG. 7C. The press bending machine 20 includes a pair of swingable dies 23 which are swingably supported on a cushion base 21 with rollers 22, 22 interposed therebetween, so that the pipe material P carried on the swingable dies 23, 23, is pressed and bent by a ram 24. By bending the pipe material P with the bulge 9 turned outwardly in this manner, wrinkles can be prevented from being formed in the vicinity of the bulge, thus achieving a fine finish. In this case, the plate-like portions $2_1$, $2_1$, $4_1$, $4_1$ are formed by cutting-out the opposite ends of the pipe material prior to the bending by the press bending machine 20.

Then, the pipe material P is again bulged by a bulging machine 25 shown in FIG. 7D. The bulging machine 25 includes split dies 26 and 27 for supporting the pipe material P therein, sealing members 28 and 29 which are slidable in an axial direction to abut against the opposite end faces of the pipe material P, and a piston 31 which is slidably received in a cylinder $27_1$ formed in one of the split dies 27 and which is biased by a spring 30. If high pressure is applied to oil filled in the pipe material P while moving the sealing members 28 and 29 inwardly, the bulge 9 of the pipe material P is further swelled into the cylinder $27_1$ while urging the piston 31, thereby forming a final bulge 9 shown in FIG. 1.

In this manner, the bulge 9 having a sufficient height, can be formed by the two bulging steps, and the wall thickness of the bulge 9 reduced upon the press bending, can be restored by a flow of the material produced by the bulging. Thus, a piece of pipe material P having a uniform thickness can be produced. In the second bulging step, the pipe material P is formed into an elliptical shape with its cross-sectional shape or cross-sectional area varied in a longitudinal direction.

Subsequently, as shown in FIG. 8A, the support holes $2_3$, $2_3$ are made in the first vehicle body pivoting portion 2 by a burring machine 34 including a burring die 32 and a punch 33. Further, as shown in FIG. 8B, the support holes $4_3$, $4_3$ are made in the knuckle pivoting portion 4 by a burring machine 37 including a burring die 35 and a punch 36. Thus, the arm body 1 of the suspension arm A is completed.

Finally, as shown in FIG. 8C, the suspension arm A is completed by welding (at 11) the collar 10 to the bulge 9 of the arm body 1.

The suspension arm A is formed from the only two members: the arm body 1 and the collar 10. Moreover, the arm body 1 is formed from the piece of pipe material P having a closed cross-section and having no opening at any location other than the opposite ends thereof. Therefore, it is possible to achieve reductions in weight and manufacturing costs of the suspension arm A by a simple structure made from a reduced number of parts.

Figure 14:
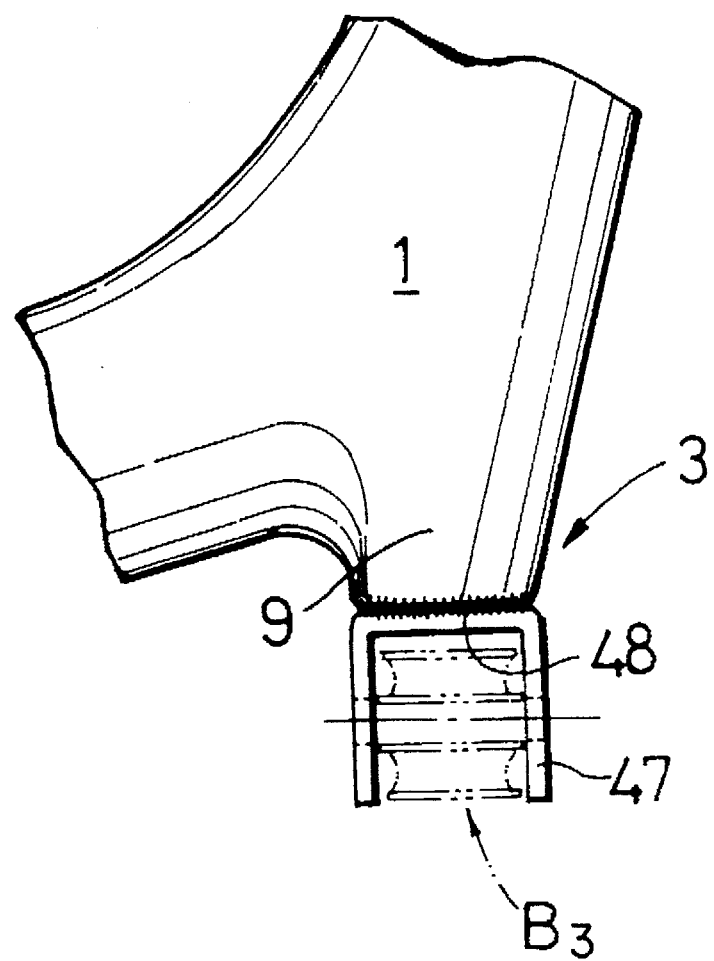
FIG. 14 is a view illustrating a modification to the second vehicle body pivoting portion in the first embodiment.

As seen in FIG. 14, in a modification to the second vehicle body pivoting portion 3 of the first embodiment, a bracket 47 may be welded at 48 to the bulge 9 in place of welding of the collar 10 to the bulge 9, and a rubber bush $B_3$ may be supported on the bracket 47.

Figure 15A:
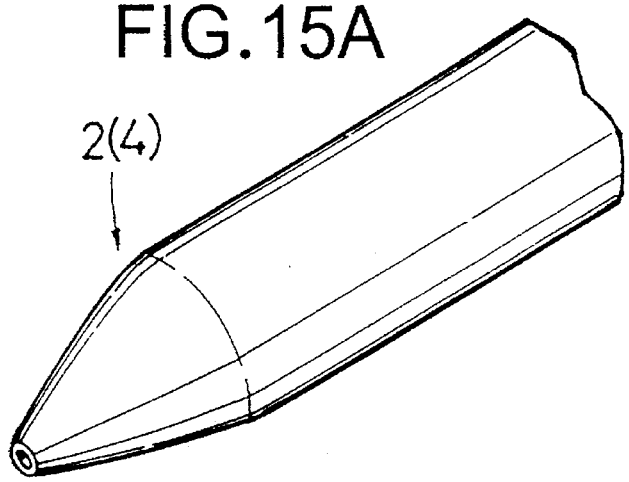
FIGS. 15A–15C are views illustrating a modification to the first vehicle body pivoting portion or the knuckle pivoting portion in the first embodiment.
Figure 15B:
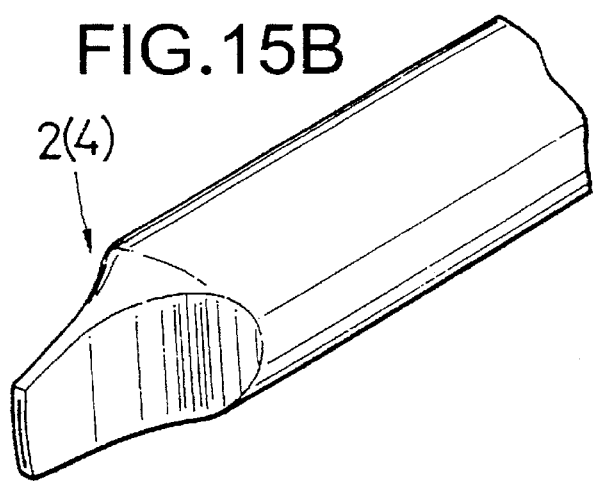
Figure 15C:
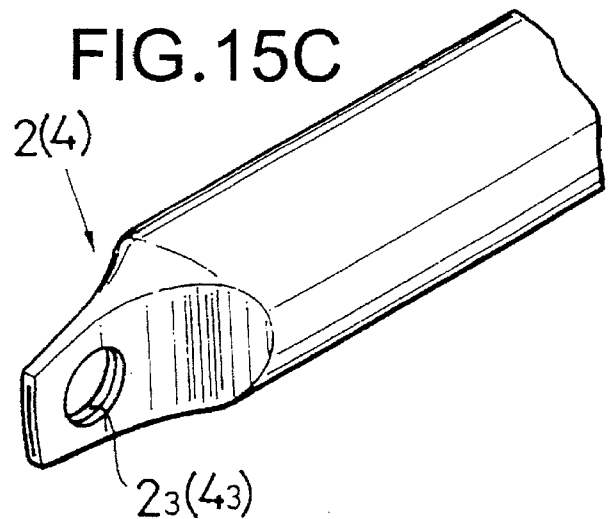
Figure 16A:
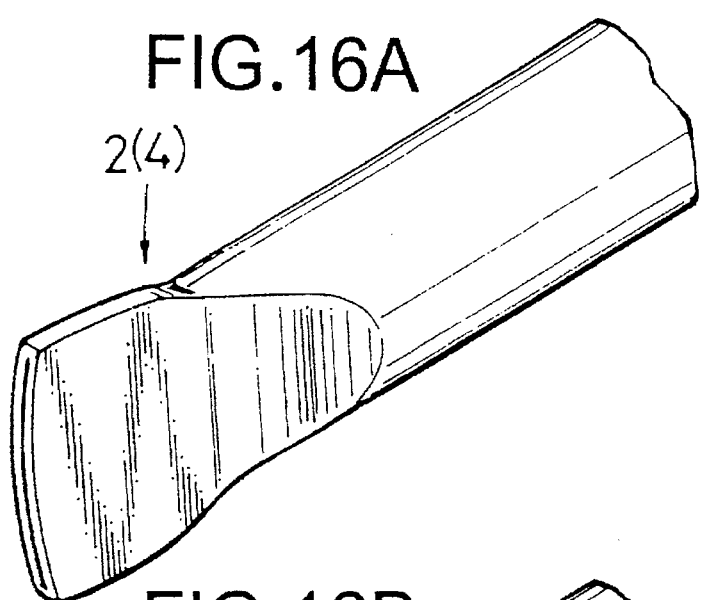
FIGS. 16A–16C are views illustrating a modification to the first vehicle body pivoting portion or the knuckle pivoting portion in the first embodiment.
Figure 16B:
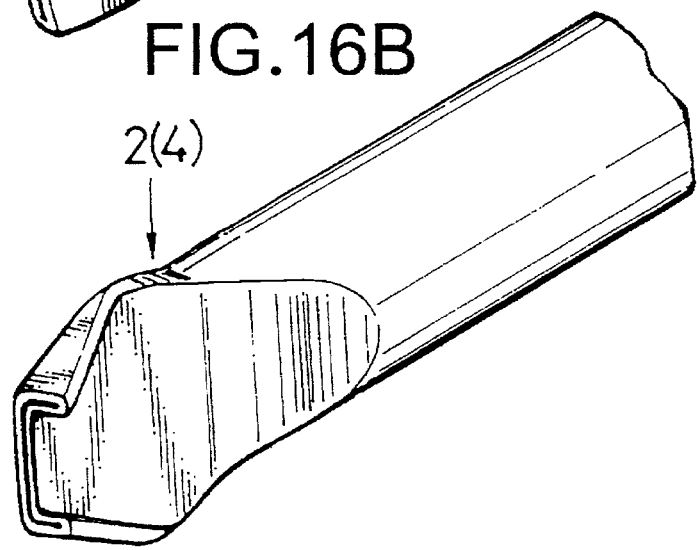
Figure 16C:
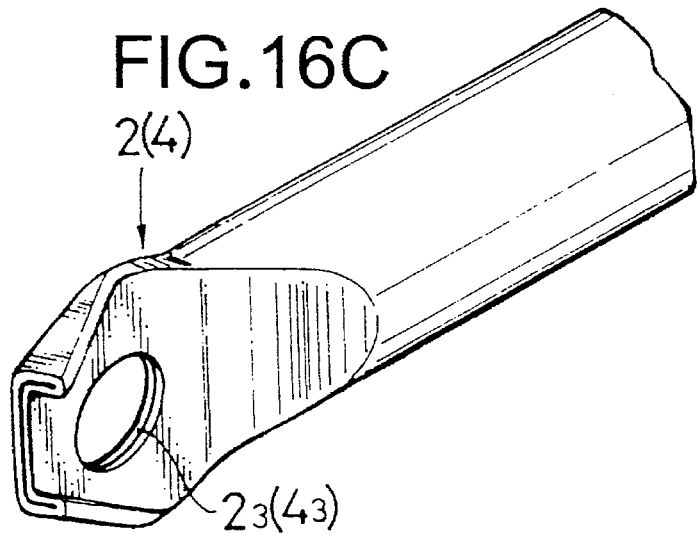

In a modification to the first vehicle body pivoting portion 2 or the knuckle pivoting portion 4, as shown in FIGS. 15A–15C, the tip end of the arm body 1 may be formed into a tapered shape by swaging and then flattened by pressing, and a support hole $2_3$ ($4_3$) may be made in the flattened portion by burring or drilling. Alternatively, as shown in FIGS. 16A–16C, the tip end of the arm body 1 may be flattened by pressing and then, opposite edges of the flattened portion may be folded by pressing, and finally a support hole $2_3$ ($4_3$) may be made by burring or drilling.

If the processing steps shown in FIGS. 15A–15C and 16A–16C are employed, even if the tip end of the arm body 1 is flattened by pressing, the width of the tip end can be prevented from being increased, and the first vehicle body pivoting portion 2 or the knuckle pivoting portion 4 can be formed in a compact manner, thereby avoiding interference with the other members.

Figure 9:
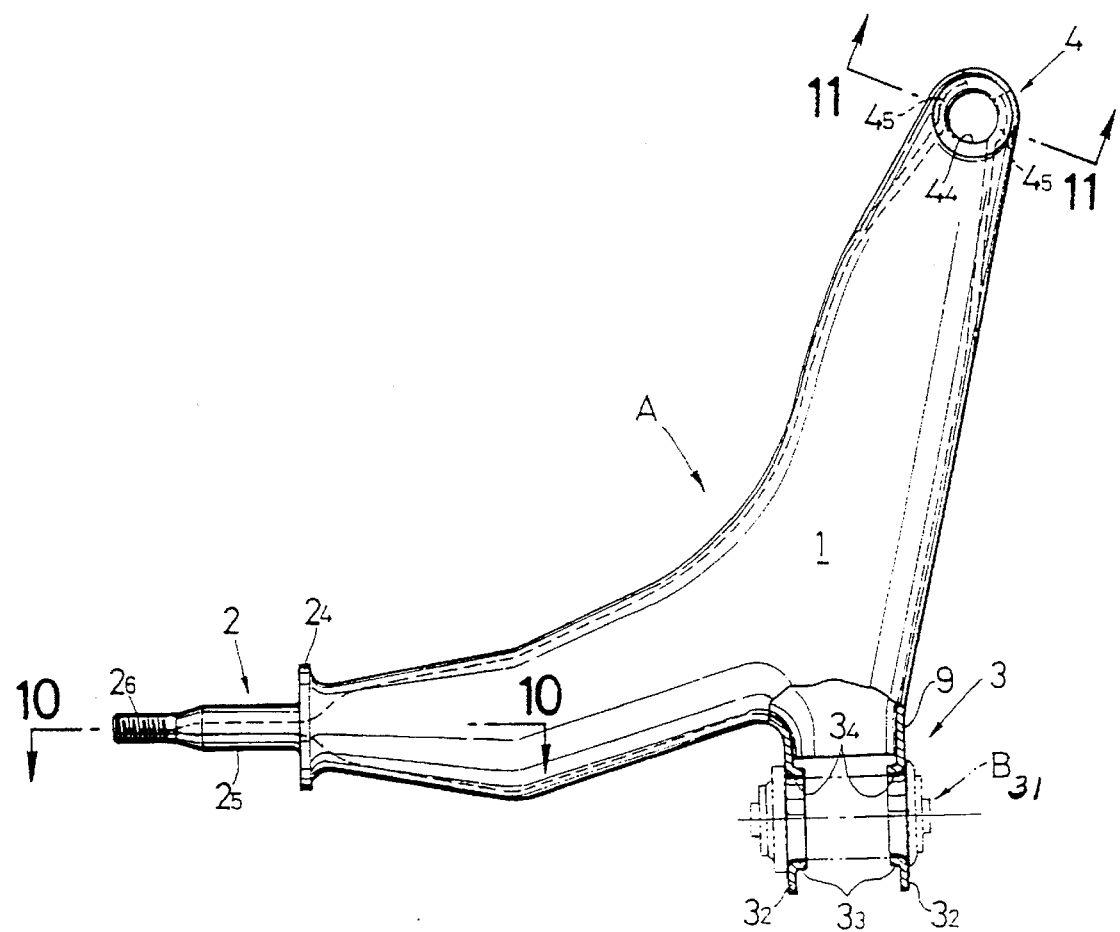
FIG. 9 is a plan view of the entire suspension arm according to a second embodiment of the present invention.

FIGS. 9 to 13 illustrate a second embodiment of the present invention. As shown in FIG. 9, the suspension arm A of the second embodiment includes an arm body 1 which has the substantially same shape as the arm body 1 of the suspension arm A of the first embodiment, except that it differs from the arm body 1 of the suspension arm A of the first embodiment in the structure of the first vehicle body pivoting portion 2, the second vehicle body pivoting portion 3 and the knuckle pivoting portion 4.

Figure 10:
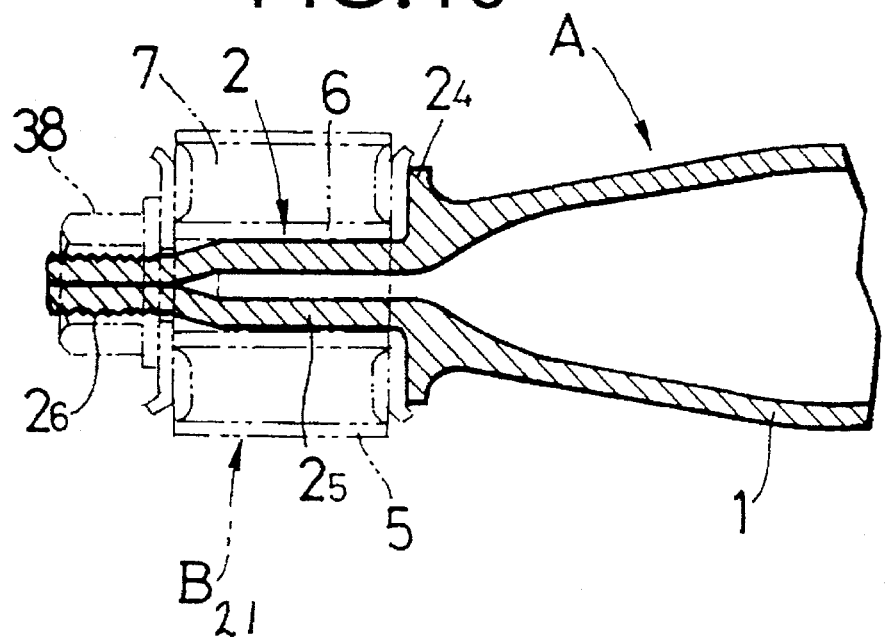
FIG. 10 is a sectional view taken along a line 10—10 in FIG. 9.

As shown in FIGS. 9 and 10, the first vehicle body pivoting portion 2 includes a support shaft $2_5$ connected to a flange $2_4$. A nut 38 is threadedly fitted over a threaded portion $2_6$, with an inner collar 6 of a rubber bush $B_{21}$ being fitted over the support shaft $2_5$.

Figure 17:
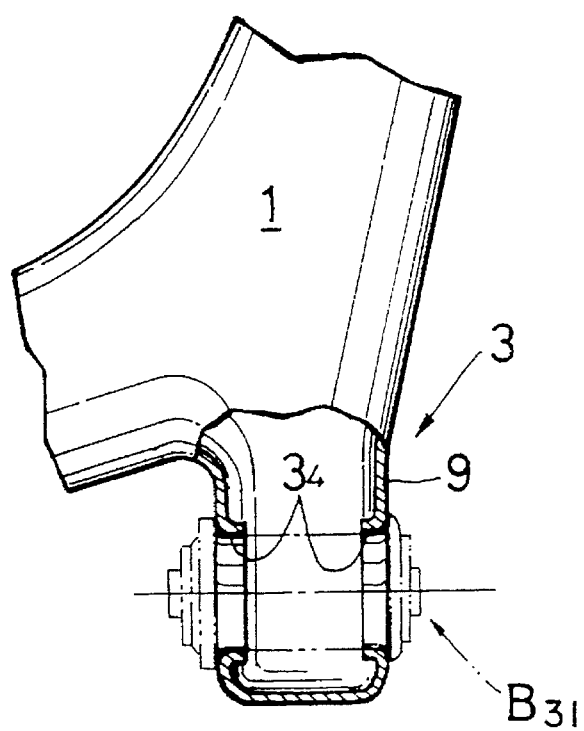
FIG. 17 is a view illustrating a modification to the second vehicle body pivoting portion in the second embodiment.

As shown in FIG. 9, the second vehicle body pivoting portion 3 includes a pair of plate-like portions $3_2$, $3_2$ formed by cutting-out a bulge 9 in the arm body 1. Support holes $3_4$, $3_4$ for fitting of the rubber bush $B_{31}$ therein, are made by forming flanges $3_3$, $3_3$ turned inwardly on the plate-like portions $3_2$, $3_2$, respectively. In a modification to the second vehicle body pivoting portion 3, support holes $3_4$, $3_4$ may be made without cutting-out of the bulge 9, as shown in FIG. 17.

Figure 11:
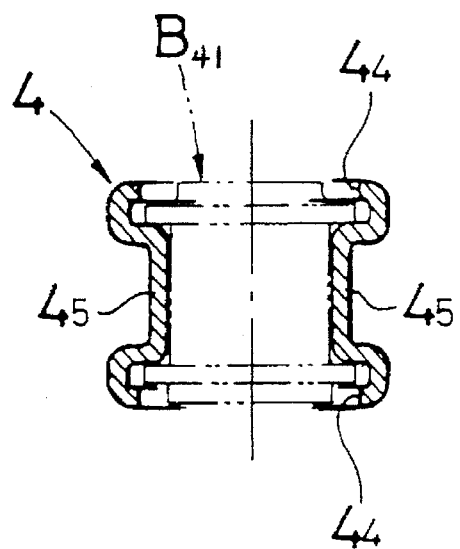
FIG. 11 is a sectional view taken along a line 11—11 in FIG. 9.

As can be seen from FIGS. 9 and 11, the knuckle pivoting portion 4 includes a pair of openings $4_4$, $4_4$ provided by machining, and a pair of supporting portions $4_5$, $4_5$ formed by pressing, to project inwardly in order to retain an outer periphery of an outer collar 5 of the rubber bush $B_{41}$ fitted between the openings $4_4$, $4_4$.

The suspension arm A having the above-described construction is produced by a process shown in FIGS. 12A–12D and 13A–13D.

Steps shown in FIGS. 12A–12D are substantially the same as the steps shown in FIGS. 7A–7D. However, in the second embodiment, the bulge 9 is formed at the steps shown in FIGS. 12B and 12D, so that the amount the bulge projects is larger than that in the first embodiment.

Figure 18:
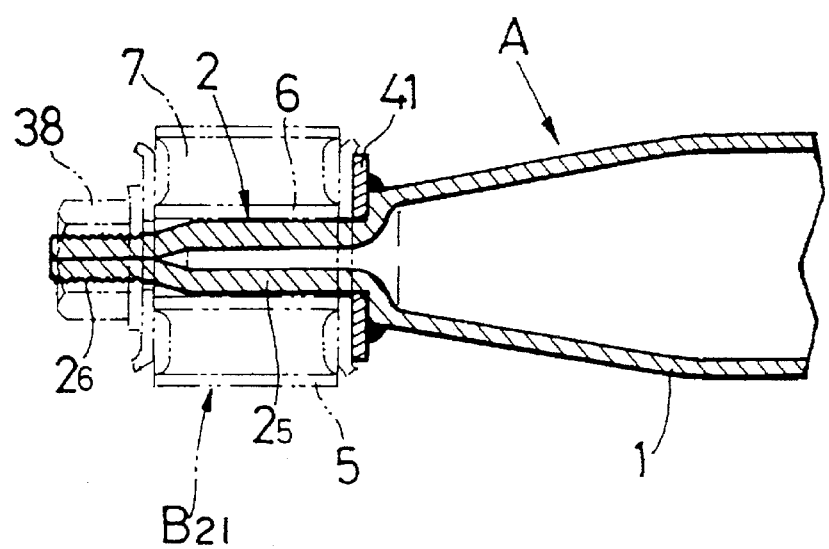
FIG. 18 is a view illustrating a modification to the first vehicle body pivoting portion in the second embodiment.

Then, a die 40 of a swaging machine 39 shown in FIG. 13A, is urged against the tip end of the first vehicle body pivoting portion 2 while being rotated, thereby forming the support shaft $2_5$. The threaded portion $2_6$ is thereafter formed at the tip end of the support shaft $2_5$. The flange $2_4$ at the end of the support shaft $2_5$ is separately formed by upsetting. Alternatively, rather than upsetting, a washer 41 may be welded in place, as shown in FIG. 18.

Then, in a condition in which the rubber bush $B_{41}$ has been fitted in the pair of openings $4_4$, $4_4$ provided in the knuckle pivoting portion 4, the wall of the knuckle pivoting portion 4 is deformed inwardly by dies 43, 43 of a press machine 42, thereby forming the support portions $4_5$, $4_5$ for supporting the outer periphery of the outer collar 5 to fix the rubber bush $B_{41}$.

Finally, as shown in FIG. 13C, the bulge 9 is cut to form the pair of plate-like portions $3_2$, $3_2$, and the support holes $3_4$, $3_4$ for a rubber bush are made in the plate-like portions $3_2$, $3_2$ by a burring machine 46 including a burring die 44 and a punch 45.

As modifications to the knuckle pivoting portion 4, any of structures shown in FIGS. 19A–19D, 20A–20E and 21A–21D may be employed.

Figure 19A:
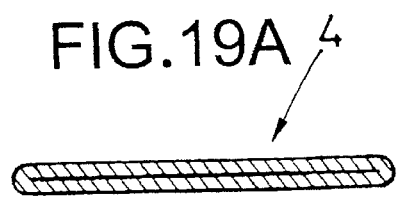
FIGS. 19A–19D are views illustrating a modification to the knuckle pivoting portion in the second embodiment.
Figure 19B:
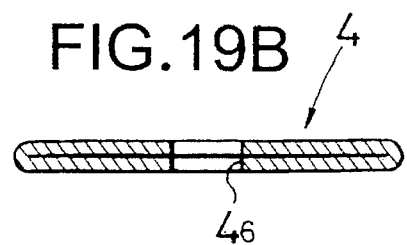
Figure 19C:
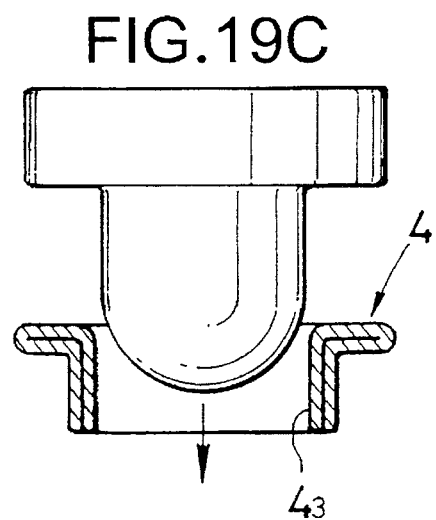
Figure 19D:
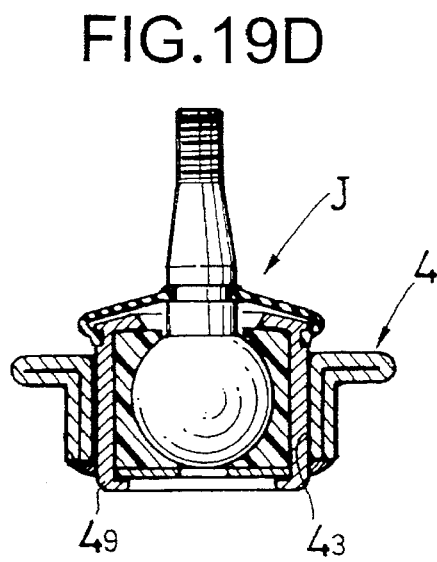

In the modification shown in FIGS. 19A–19D, the tip end of the arm body 1 is formed into a tapered shape by swaging and then flattened by pressing (see FIG. 19A), and a lower hole 46 is made in the tip end by drilling (see FIG. 19B). Then, the lower hole $4_6$ is widened by burring to provide a support hole $4_3$ (see FIG. 19C), and a housing 49 of a ball joint J is press-fitted into and welded to the support hole $4_3$ (see FIG. 19D).

Figure 20A:
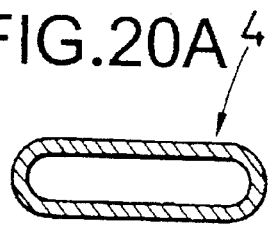
FIGS. 20A–20E are views illustrating a modification to the knuckle pivoting portion in the second embodiment.
Figure 20B:
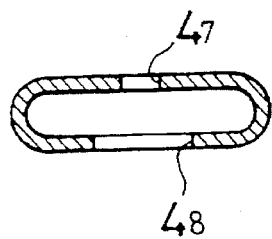
Figure 20C:
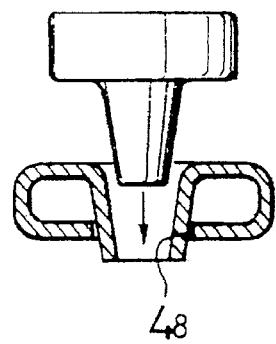
Figure 20D:
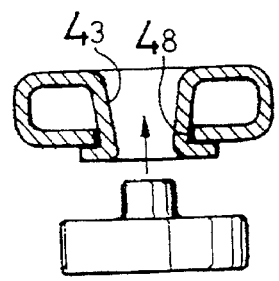
Figure 20E:
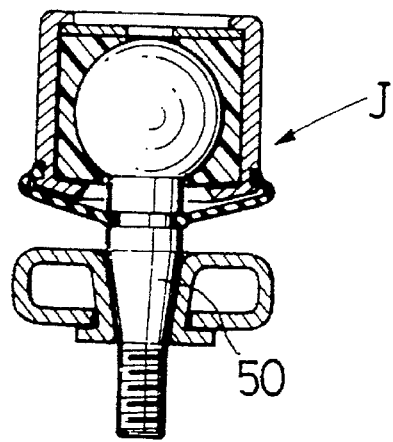

In the modification shown in FIGS. 20A–20E, the tip end of the arm body 1 is formed into a tapered shape by swaging (see FIG. 20A), and an upper hole $4_7$ having a smaller diameter and a lower hole $4_8$ having a larger diameter are made in the tip end by pressing (see FIG. 20B). Then, the upper hole $4_7$ of the smaller diameter is subjected to burring, whereby it is passed through the lower hole $4_8$ of the larger diameter (see FIG. 20C), and then a portion of the upper hole $4_7$ projecting from the lower hole $4_8$ of the larger diameter is caulked to provide a tapered support hole $4_3$ (see FIG. 20D). Subsequently, a tapered pin 50 of a ball joint J is fitted into the support hole $4_3$ and fixed by a nut which is not shown (see FIG. 20E).

Figure 21A:
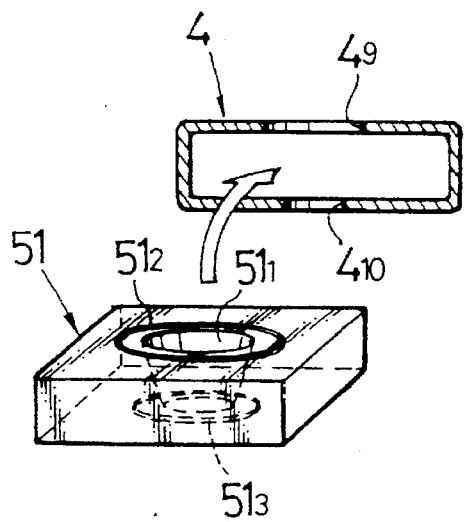
FIGS. 21A–21D are views illustrating a modification to the knuckle pivoting portion in the second embodiment.
Figure 21C:
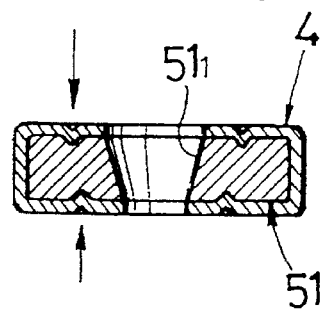
Figure 21B:
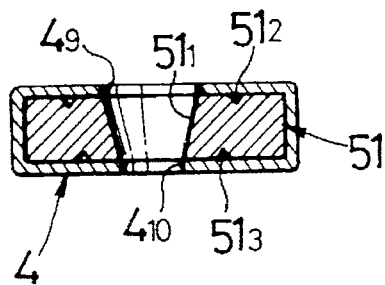
Figure 21D:
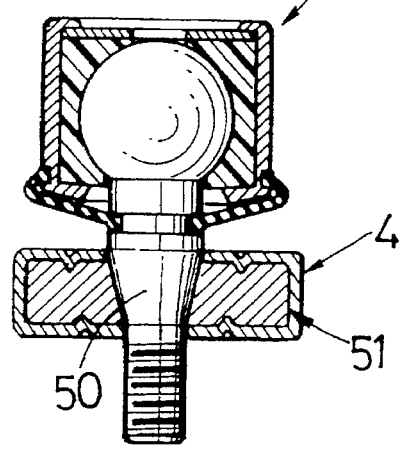

In the modification shown in FIGS. 21A–21D, the tip end of the arm body 1 is formed into a tapered shape by swaging (see FIG. 20A) and then formed into an elliptical cross-sectional shape by pressing, and a larger-diameter hole $4_9$ and a smaller-diameter hole $4_{10}$ are made in the tip end by drilling (see FIG. 21A). A block 51 having a tapered support hole $51_1$ and a pair of ring-like caulking grooves $51_2$ and $51_3$ is fitted into the tip end of the arm body 1 (see FIG. 21B), and portions corresponding to the caulking grooves $51_2$ and $51_3$ are caulked, whereby the block 51 is fixed (FIG. 21C). A tapered pin 50 of a ball joint J is fitted into the support hole $51_1$ and fixed by a nut which is not shown (see FIG. 21D).

In the second embodiment, the suspension arm A is constructed from only the arm body 1 and hence, the number of parts is minimal. Moreover, the arm body 1 is formed from a piece of pipe material P having a closed cross-section and hence, is extremely lightweight and highly rigid.

The structures of the first vehicle body pivoting portion 2, the second vehicle body pivoting portion 3 and the knuckle pivoting portion 4 of the suspension arm A according to the first embodiment of the present invention may be replaced with the structures of the first vehicle body pivoting portion 2, the second vehicle body pivoting portion 3 and the knuckle pivoting portion 4 of the suspension arm A according to the second embodiment of the present invention.

As discussed above, according to the present invention, the arm body is formed from a single piece of pipe material having a closed cross-section and therefore, it is possible not only to produce a suspension arm which is lightweight and highly rigid, but also to decrease the number of parts and processing steps to thereby reduce the cost of manufacturing.

Further, according to the present invention, the piece of pipe material with the bulge turned outwardly is bent into a substantially L-shape and therefore, it is possible to inhibit the generation of wrinkles at the bent portion to achieve a fine finish. In addition, since the bulge is formed by two bulging steps, the bulge has a satisfactory height and the decrease in wall thickness of the bent portion can be recovered by the second bulging step to make the wall thickness of the arm body uniform.

Still further, according to the present invention, when the piece of pipe material is subjected to the second bulging step, the cross-sectional area or the cross-sectional shape of the pipe material is changed. Therefore, it is possible to produce the arm body including the bulge of the desired shape, with a decreased number of steps.

Still further, according to the present invention, the second vehicle body pivoting portion is formed by welding the dollar or the bracket to the bulge. Therefore, the second vehicle body pivoting portion can be formed simply, decreasing the number of parts and the number of steps.

Still further, according to the present invention, the second vehicle body pivoting portion has a support hole made by drilling through the bulge. Therefore, the second vehicle body pivoting portion can be formed simply, decreasing the number of parts and the number of steps.

Still further, according to the present invention, the first vehicle body pivoting portion or the knuckle pivoting portion has a support hole made by drilling the end of the pipe material. Therefore, the first vehicle body pivoting portion or the knuckle pivoting portion can be formed simply, decreasing the number of parts and the number of steps.

Still further, according to the present invention, the first vehicle body pivoting portion or the knuckle pivoting portion has the support shaft formed by subjecting the end of the pipe material to plastic working. Therefore, the first vehicle body pivoting portion or the knuckle pivoting portion can be formed simply, decreasing the number of parts and the number of steps.

Still further, according to the present invention, the first vehicle body pivoting portion or the knuckle pivoting portion has the support portion formed by pressing the end of the pipe material. Therefore, the first vehicle body pivoting portion or the knuckle pivoting portion can be formed simply, decreasing the number of parts and the number of steps.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come Within the meaning and range of equivalency of the claims are, therefore, to be embraced therein.

We claim:

1. A suspension arm for a vehicle, said suspension arm comprising an L-shaped arm body having a first end portion, an intermediate portion, and a second end portion, said first end portion having first connecting means for pivotally connecting said arm body to a vehicle, said intermediate portion having a second connecting means formed as a bulged portion integral with said arm body for pivotally connecting said arm body to the vehicle, and said second end portion having third connecting means for pivotally connecting said arm body to a vehicle wheel knuckle, and wherein said arm body and said second connecting means are formed from a single piece of pipe material having a closed cross-section.

2. A suspension arm for a vehicle as set forth in claim 1, wherein said first connecting means includes support holes formed in said piece of pipe material.

3. A suspension arm for a vehicle as set forth in claim 1, wherein said first connecting means includes a connecting rod integrally formed on said piece of pipe material.

4. A suspension arm for a vehicle as set forth in claim 1, wherein said third connecting means includes support holes for receiving ball joint means therein.

5. A suspension arm as set forth in claim 1, wherein said second connecting means includes a collar.

6. A suspension arm as set forth in claim 1, wherein said second connecting means includes a bracket.

* * * * *